US011949187B2

(12) United States Patent
Heinze

(10) Patent No.: US 11,949,187 B2
(45) Date of Patent: Apr. 2, 2024

(54) HOSE CLAMP

(71) Applicant: Oetiker Schweiz AG, Horgen (CH)

(72) Inventor: Philipp Heinze, Dübendorf (CH)

(73) Assignee: Oetiker Schweiz AG, Horgen (CH)

( * ) Notice: Subject to any disclaimer, the term of this patent is extended or adjusted under 35 U.S.C. 154(b) by 329 days.

(21) Appl. No.: 17/612,459

(22) PCT Filed: May 31, 2020

(86) PCT No.: PCT/EP2020/065103
§ 371 (c)(1),
(2) Date: Nov. 18, 2021

(87) PCT Pub. No.: WO2020/240035
PCT Pub. Date: Dec. 3, 2020

(65) Prior Publication Data

US 2022/0239035 A1 Jul. 28, 2022

(30) Foreign Application Priority Data

May 31, 2019 (WO) ................. PCT/EP2019/064194

(51) Int. Cl.
*H01R 13/00* (2006.01)
*H01R 13/58* (2006.01)
*H01R 13/6592* (2011.01)

(52) U.S. Cl.
CPC ..... *H01R 13/5812* (2013.01); *H01R 13/6592* (2013.01)

(58) Field of Classification Search
CPC ........................ H01R 13/5812; H01R 13/6592
See application file for complete search history.

(56) References Cited

U.S. PATENT DOCUMENTS

| | | | | |
|---|---|---|---|---|
| 4,963,104 A * | 10/1990 | Dickie | H01R 13/595 | 439/465 |
| 6,478,609 B1 * | 11/2002 | Davis | H01R 13/5812 | 439/465 |
| 2015/0090491 A1 * | 4/2015 | Dunwoody | H01R 13/6593 | 174/102 R |
| 2021/0234291 A1 * | 7/2021 | Zerebilov | H01R 12/75 | |

FOREIGN PATENT DOCUMENTS

| | | |
|---|---|---|
| JP | 2007009308 A | 1/2007 |
| JP | 2017071215 A | 4/2017 |
| WO | 2018168831 A1 | 9/2018 |

OTHER PUBLICATIONS

International Search Report Form PCT/ISA/210, and Written Opinion Form PCT/ISA/237, International Application No. PCT/EP2020/065103, pp. 1-10 International Filing Date May 31, 2020.

* cited by examiner

*Primary Examiner* — Phuong Chi Thi Nguyen
(74) *Attorney, Agent, or Firm* — David L. Nocilly; Bond Schoeneck & King, PLLC

(57) ABSTRACT

For the fastening of the shielding of a cable having a conductor, an insulation surrounding the conductor and an outer shielding, there is disclosed a band clamp having an insulating coating. Measures are taken to make the coating robust and durable and to prevent contact corrosion on the shielding and the band clamp.

10 Claims, 1 Drawing Sheet

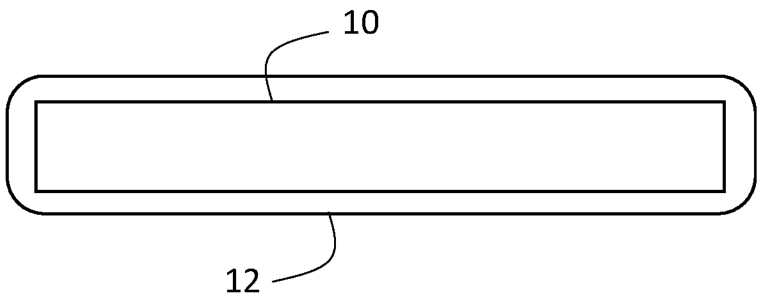
10
12

HOSE CLAMP

CROSS-REFERENCE TO RELATED APPLICATIONS

The present application is a US national phase of PCT Application No. PCT/EP2020/065103, filed on May 31, 2020, which claims priority to the PCT Application No. PCT/EP2019/064194 filed on May 31, 2019, the disclosures of which are incorporated herein by reference in their entirety.

The invention relates to a band clamp for fastening the shielding of a cable to a tube, for example when attaching current-carrying cables or cable harnesses by means of connectors to batteries, motors, generators, body parts, for example in electric vehicles.

PRIOR ART

Often, such cables have several individually or jointly shielded leads, and the shielding of the cable is fastened, for example, to the tube (a sleeve) of a connector by means of a band clamp.

The cables comprise leads having conductors often made of aluminum and an insulation and on the insulation a shielding made of a braid also made of aluminum.

Attachment of such a cable by means of a band clamp to a plug is disclosed in WO 2018/168831 A1. The plug has a housing with a tube made of aluminum. The leads are inserted through the tube into the plug housing, while the braid serving as a shielding is placed over the tube on the outside. The band clamp clasps around the shielding in a ring shape and presses it onto the outer circumferential surface of the tube.

If common band clamps made of a CrNi steel are used for this purpose, there is a risk of contact corrosion between the clamp and the aluminum shielding and, as the case may be, the tube or cable conductor of aluminum. In order to avoid contact corrosion, the band clamp according to WO 2018/168831 A1 is coated with an insulator. Zinc flakes embedded in the insulator are also said to act as a sacrificial electrode.

SUMMARY OF THE INVENTION

Typical band clamps, such as also the one disclosed in WO 2018/168831 A1, are substantially ring-shaped with an a-shaped protuberance, also known as an ear, which serves as a tensioning or tightening device. In order to tension or tighten the clamp on the material to be fastened, in this case the shielding on the tube, the ear is narrowed with a tool and thus the diameter of the ring formed by the clamp is reduced and the clamp is tightened over the shielding. In this process, the degree of plastic deformation of the clamp is very high. The application of the tool to the ear, the deformation of the ear and the friction of the clamp on the material to be fastened, as well as high temperatures during operation, can lead to such damage or detachment of the coating of the clamp known from WO 2018/168831 A1 that the corrosion-preventing effect is lost.

It is, therefore, an object of the invention to inhibit the aforementioned corrosion between the shielding of the current-carrying cable and the band clamp.

The solution of this object is achieved by the invention as set forth in the appended claims.

The invention relates to a band clamp constructed as previously described, but provides for a particularly robust and durable coating of the band clamp which does not lose its corrosion-inhibiting effect even during assembly and operation.

BRIEF DESCRIPTION OF THE SEVERAL VIEWS OF THE DRAWINGS

FIG. 1 is a cross-sectional view of a band clamp according to the present invention.

DESCRIPTION OF PREFERRED EMBODIMENTS OF THE INVENTION

Band clamps of embodiments of the invention are made, for strength, of a band of steel, for example CrNi steel, coated as described below. In use, the steel band is closed to form a ring and surrounds the item to be secured or fastened, in this case a shielding, on a tube. The shielding is made as a braid of a material having good electrical conductivity, such as copper or aluminum. The tube is a sleeve as part of a housing of a connector or plug, or another sleeve into which the leads of the shielded cable enter. The cross-section of the tube may be oval or circularly round. The band clamp has a tensioning device such as the ear described above.

According to one embodiment of the invention, the band clamp 10 is provided with an insulating coating 12 of a polymer. Parylene, in particular Parylene HT, has proved to be particularly suitable as a polymer material, which is preferably vapour-deposited onto the degreased band clamp from the gas phase in a vacuum chamber.

The polymer coating withstands high operating temperatures and permits severe plastic deformation, even at the ear-shaped tensioning device, without detaching from the band clamp.

To prevent the CrNi steel of the clamp from being contacted, it is advisable to coat not only the inner surface but also the side edges and preferably the entire surface of the band clamp.

The polymer coating is applied to the finished steel band clamp in the last step of the clamp production process. It should have a thickness of no more than 20 μm, for example about 10 μm. At this thickness, the risk of impairing the clamp function, in particular its elasticity, is low. The polymer coating follows the deformation of the clamp without crumbling.

According to another embodiment of the invention, in order to prevent corrosion between the band clamp and the cable shielding, a Zn layer, preferably with a passivating Zn oxide layer on its surface, is applied to the surface of the band clamp, and a top coat of a polymer layer, in particular a synthetic resin layer, is again applied thereover. The latter should again have a thickness in the order of about 5 to 20 μm, for example about 10 μm. Again, preferably the entire surface of the band clamp is so coated.

The passivated Zn layer contributes to corrosion protection and has a certain roughness on its surface to which the top coat adheres particularly well.

The synthetic resin layer preferably consists of TD Excel 300 stabilised with aluminum powder.

Aluminum powder in the top coat has a favourable effect on preventing contact corrosion against the shielding, which is also made of aluminum. It also makes the coating resistant to damage when tensioning the band clamp.

In detail, to apply the coating, the steel band clamp is first degreased, provided with the Zn layer over its entire surface by thermal diffusion (Zn thermal diffusion or sherardizing), then washed, then passivated by a Zn oxide layer and finally sealed with a top polymer or synthetic resin layer.

Alternatively, the Zn layer may be applied by Zn flake coating instead of thermal diffusion and then forms a Zn flake coating. The zinc layer is applied as a closed layer on the entire surface of the band clamp.

The polymer or synthetic resin layer mentioned above is suitable as a top coat, but an inorganic system is also suitable. The polymer used may also be the aforementioned Parylene. Additional layers may be provided over the top coat, for example to give the coating a desired appearance.

The powder may be mixed in the top coat. The particles of the powder can also be in the form of flakes.

Advantageously, the powder in the top coat has a higher hardness than its main constituents (polymer or synthetic resin). The top coat can therefore also have ceramic powder or flakes added to it, also in addition to the other powders mentioned herein. This increases its abrasion resistance and thus the resistance of the coating to the tensioning tool and to friction in the event of displacements above the shielding, such as may occur during tensioning (tightening) and in operation in the event of vibrations and temperature changes.

The use of silicates is particularly advantageous for this. Also, a thin silicate layer, for example up to 3 μm thick, can be applied between the Zn layer and the top coat (the latter optionally mixed with powder, in particular aluminum powder).

Generally, powders or flakes of substantially the same material as that of the shielding can be used in the top coat, for example aluminum powder in the case of an aluminum shielding or copper powder in the case of a copper shielding. As a result, there is no contact corrosion between the top coat and the shielding and the surfaces remain corrosion free and of good optical quality. Any contact corrosion among the other components is suppressed by the Zn layer under the top coat.

All of the coatings described withstand high temperatures, adhere well to and are malleable together with the band clamp so that they remain unaffected during assembly, clamp tensioning (tightening) and operation.

Advantageously, the features of the embodiments may also be combined with each other

The invention claimed is:

1. A band clamp for fastening the shielding of a cable to a tube, the cable having a conductor, an insulation surrounding the conductor and an outer shielding, wherein:

the band clamp is provided with a coating inhibiting corrosion between the band clamp and the tube or shielding, the coating comprises a Zn layer, the Zn layer is a thermally diffused layer or a flake coating layer and is passivated by a Zn oxide layer, the coating comprises a top coat applied over the Zn layer, and the top coat comprises a polymer or synthetic resin layer.

2. The band clamp of claim 1, wherein the top coat comprises aluminum.

3. The band clamp of claim 1, wherein the top coat comprises ceramic.

4. The band clamp of claim 1, wherein the top coat comprises silicate.

5. The band clamp of claim 1, having a silicate layer between the Zn layer and the top coat.

6. The band clamp of claim 1, wherein the coating has a maximum thickness in the order of 20 μm.

7. A system comprising a cable, and a band clamp for fastening a shielding of the cable to a tube;

wherein the band clamp for fastening the shielding of a cable to a tube, the cable having a conductor, an insulation surrounding the conductor and an outer shielding, wherein the band clamp is provided with a coating inhibiting corrosion between the band clamp and the tube or shielding, the coating comprises a Zn layer, the Zn layer is a thermally diffused layer or a flake coating layer and is passivated by a Zn oxide layer, the coating comprises a top coat applied over the Zn layer, and the top coat comprises a polymer or synthetic resin layer.

8. The system of claim 7, wherein the band clamp comprises a top coat that is blended with the same material as that of the shielding.

9. The system of claim 8, wherein the top coat has aluminum added thereto and the shielding is made of aluminum.

10. A method of manufacturing a coated band clamp, comprising:

wherein the band clamp for fastening the shielding of a cable to a tube, the cable having a conductor, an insulation surrounding the conductor and an outer shielding, wherein the band clamp is provided with a coating inhibiting corrosion between the band clamp and the tube or shielding, the coating comprises a Zn layer, the Zn layer is a thermally diffused layer or a flake coating layer and is passivated by a Zn oxide layer, the coating comprises a top coat applied over the Zn layer, and the top coat comprises a polymer or synthetic resin layer;

characterized in that the coating of the band clamp is produced by first applying the Zn layer and then applying a synthetic resin layer which is preferably stabilized with Al powder.

* * * * *